United States Patent [19]

Gudermuth, Jr.

[11] Patent Number: 4,873,782
[45] Date of Patent: Oct. 17, 1989

[54] SWIVEL TAIL ARTICULATED FISHING LURE

[75] Inventor: Clyde S. Gudermuth, Jr., Fort Smith, Ark.

[73] Assignee: EBSCO Industries, Inc., Ala.

[21] Appl. No.: 215,721

[22] Filed: Jul. 5, 1988

[51] Int. Cl.[4] ............................................. A01K 85/00
[52] U.S. Cl. .................................. 43/42.15; 43/42.16; 43/42.35
[58] Field of Search ................... 43/42.15, 42.16, 42.35

[56] References Cited

U.S. PATENT DOCUMENTS

| | | | |
|---|---|---|---|
| 2,596,201 | 3/1952 | Bocchino | 43/42.35 |
| 2,876,580 | 3/1959 | Schwartzrauber | 43/42.15 |
| 2,910,799 | 1/1959 | Wentworth | 43/42.15 |
| 2,933,846 | 3/1960 | Garner | 43/42.35 |
| 3,423,868 | 1/1969 | Master | 43/42.15 |
| 3,427,744 | 2/1969 | Roberts | 43/42.16 |
| 4,098,017 | 7/1978 | Hall | 43/42.35 |
| 4,188,743 | 2/1980 | Nothdurft | 43/42.15 |
| 4,573,282 | 3/1986 | Rowe | 43/42.15 |
| 4,733,491 | 3/1988 | Wilson et al. | 43/42.35 |

Primary Examiner—Nicholas P. Godici
Assistant Examiner—William Scott Andes
Attorney, Agent, or Firm—Laney, Doughery, Hessin & Beavers

[57] ABSTRACT

A fishing lure having a forward body portion and a tail portion movably attached to the forward body portion. A diving plane is secured to, and projects forwardly and downwardly from the front end of the forward body portion. The tail section is a two-part structure having a top half and an interlocked bottom half. The bottom half carries a post projecting upwardly to serve as an anchor point for a hook hanger which extends outwardly from the rear of the lure. A neck projects from the tail section forwardly toward the forward body portion, and carries a ball which is held within a socket defined in the forward body portion.

9 Claims, 2 Drawing Sheets

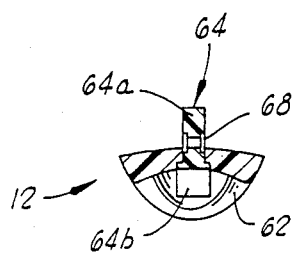 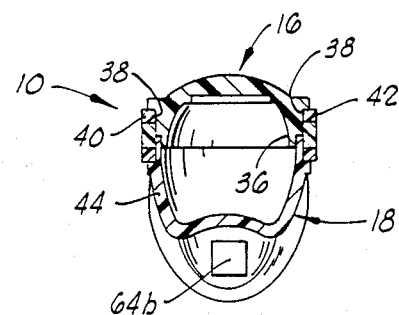
FIG. 8   FIG. 9
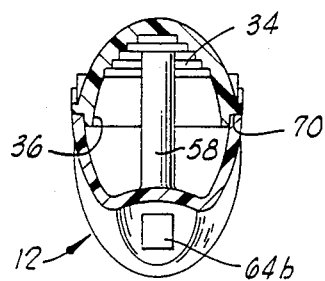 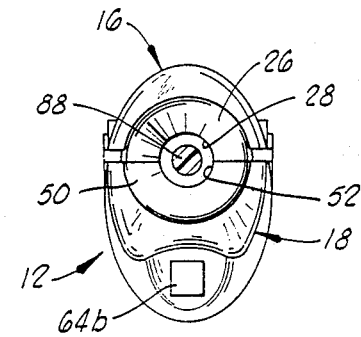
FIG. 10   FIG. 11
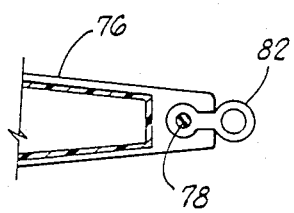 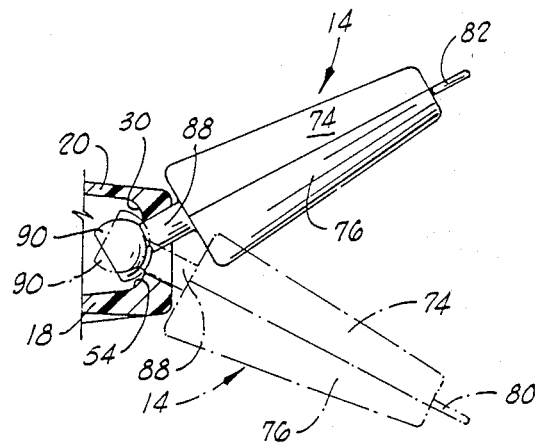
FIG. 12   FIG. 13

SWIVEL TAIL ARTICULATED FISHING LURE

FIELD OF THE INVENTION

This invention relates to a fishing lure having an articulated body in which a tail section is swively connected to a forward body section.

BACKGROUND OF THE INVENTION

Brief Description of The Prior Art

In U.S. Pat. No. 4,733,491 a fishing lure is shown which is made up of a pair of interfitting body halves with a diving plane mounted at the forward end of the lure. The diving plane structure includes a graphite-type pull plate to which the line used for retrieving the lure can be attached.

One of the features of the lure shown in U.S. Pat. No. 4,733,491 is the provision on the hollow concave interior of the upper half of the two interfitted body halves of a plurality of concentrically arranged steps or terraces which impart an unusual visual appearance to the lure when it is viewed from above or from the side. Moreover, these concentric steps add strength to the body of the lure. The lure shown in this patent further includes a pair of substantially parallel, elongated protuberant machines located on opposite sides of the lower portion of the lure body, and functioning to impart hydrodynamic stability to the lure as it is retrieved.

Brief Description of The Present Invention

The present invention provides an improved articulated fishing lure having a tail section which is swively and rotatably connected to a forward body section, and which, by reason of the described construction, enables the lure to have a more life-like action as it is retrieved. The articulation assists in avoiding fouling of the lure by the hook carried at the rear of the tail section becoming impaled on a limb or other underwater obstruction. Further, the lure of the invention can be easily constructed without difficulty by reason of the way that the parts are interfitted, and the tail section of the lure is characterized by a mechanically strong structure which enables a hook hanger to be securely affixed therein.

Broadly described, the fishing lure of the invention includes a forward body portion which has a tail pivotally and rotatably attached to the forward body portion so that the tail section can rotate about the longitudinal axis of the lure, or can pivot up and down with a flapping or waving motion resembling the motion of the tail of some natural bait species. At the front end of the body, a diving plane subassembly projects forwardly and downwardly, and in a preferred construction, the lure is constructed of a synthetic resin material and the diving plane assembly is molded integrally with the forward end of the lure. The diving plane subassembly preferably includes a graphite pull plate which is partially embedded in a spoon-shaped paddle forming a part of the diving plane assembly. The forward body portion preferably has a pair of parallel elongated chines formed on the bottom or lower side thereof.

The tail section used in the lure of the invention is a two-part structure having a top half and a bottom half interlocked together in the assembled lure. The bottom half carries a post which projects upwardly into a receiving socket in the upper half and this post functions as an anchor point for a hook hanger which projects outwardly from the rear of the lure. A neck projects from the tail section forwardly toward the forward body portion and carries a ball or other securing structure which is held within a socket formed in the rear of the forward body portion of the lure.

An important object of the present invention is to provide an improved fishing lure which has a swively connected tail which can undergo a natural swimming action as the lure is retrieved.

A further object of the invention is to provide an improved fishing lure which has an extended, trouble-free operating life.

Additional objects and advantages of the invention will become apparent as the following detailed description of the invention is read in conjunction with the accompanying drawings which illustrate a preferred embodiment of the invention.

BRIEF DESCRIPTION OF THE DRAWINGS

FIG. 8 is a sectional view taken along line 8—8 of FIG. 2.

FIG. 9 is a sectional view taken along line 9—9 of FIG. 4.

FIG. 10 is a sectional view taken along line 10—10 of FIG. 4.

FIG. 11 is a sectional view taken along line 11—11 of FIG. 2.

FIG. 12 is a detail sectional view taken along line 12—12 of FIG. 3.

FIG. 13 is a detail view, partially in section and partially in elevation, illustrating the swivelling action of the tail section of the lure.

DETAILED DESCRIPTION OF A PREFERRED EMBODIMENT OF THE INVENTION

Figure 1:
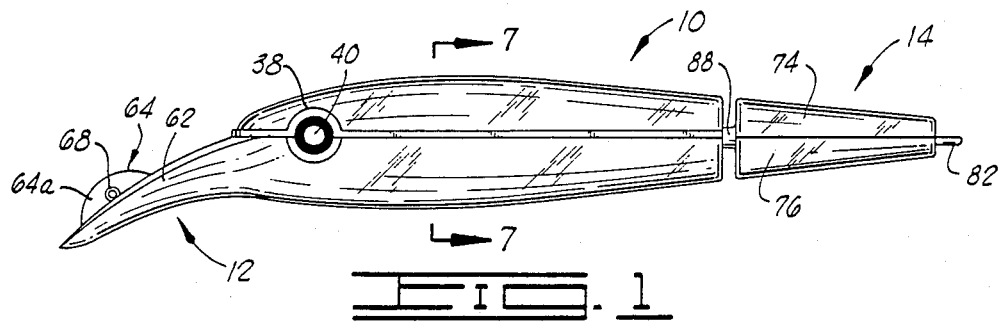
FIG. 1 is a side elevation view of a fishing lure constructed in accordance with the present invention.
Figure 2:
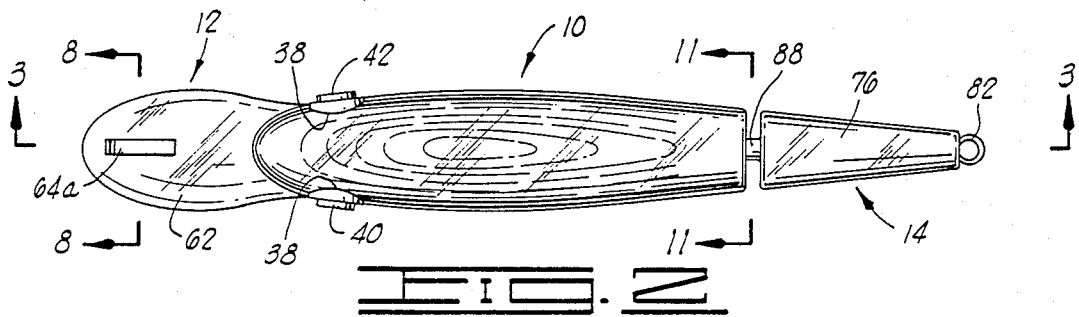
FIG. 2 is a top plan view of the fishing lure.

The fishing lure of the invention includes an elongated forward body portion designated generally by reference numeral 10. The forward body portion 10 carries a spoon-shaped diving plane 12 at the forward end thereof, and a body tail section, designated generally by reference numeral 14, is swively connected to the forward body section. These several major subassemblies which make up the lure will be individually described in detail, as will their relationship to each other.

Referring initially to the forward body portion 10, this part of the lure includes a concave upper part 16 and a concave lower part 18 which carries at its forward end, and has formed integrally therewith, the spoon-shaped diving plane 12. The entire lure is constructed of a synthetic resin material which can be injection molded, and a preferred method of construction contemplates the injection molding of both the concave upper body part 16 and the concave lower body part 18.

It will be noted that the several parts of the lure are shaped and configured by the described injection molding process so as to impart to the lure a configuration resembling that of a natural bait species, such as a shad or the like.

Referring particularly to the concave upper body part 16, this body part includes a concave outer shell 20 having a forward end 22 and a rear end 24. The rear end of the outer shell has a radially inwardly extending closure plate 26 projecting inwardly from the concave outer shell. The rear closure plate 26 defines a semicircular opening 28 which registers and cooperates with a similar semicircular opening in a lower closure plate, hereinafter described. The opening as thus formed receives the generally cylindrical neck of a neck extension from the tail section 14. The concave upper body part 16 further includes a rear transverse partition 30 which extends transversely across the concave outer shell 20, and is spaced forwardly from the rear closure plate 26 and extends parallel thereto. A rib or step 32 is carried on the lower edge of the transverse partition 30.

A plurality of oval steps or shoulders 34 of varied radial dimension are formed on the inner surface of the concave outer shell 20 of the concave upper body part 16. The shoulders or steps 34 will be perceived to follow generally the contour of the concave outer shell. The purpose of these shoulders 34 is described in U.S. Pat. No. 4,733,491.

Figure 3:
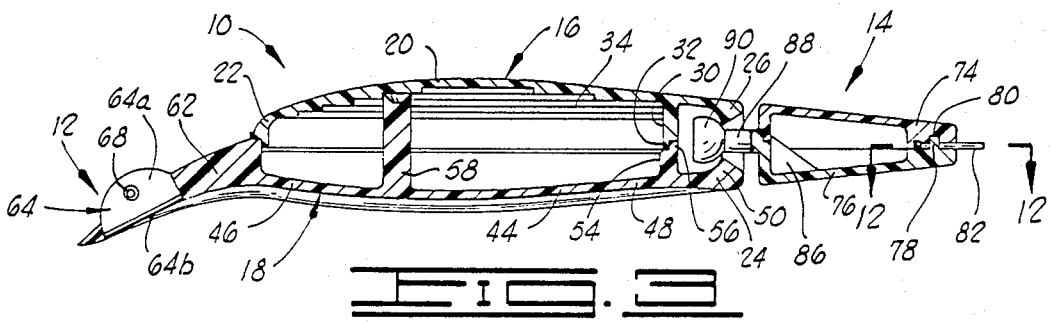
FIG. 3 is a sectional view taken along line 3—3 of FIG. 2.
Figure 4:
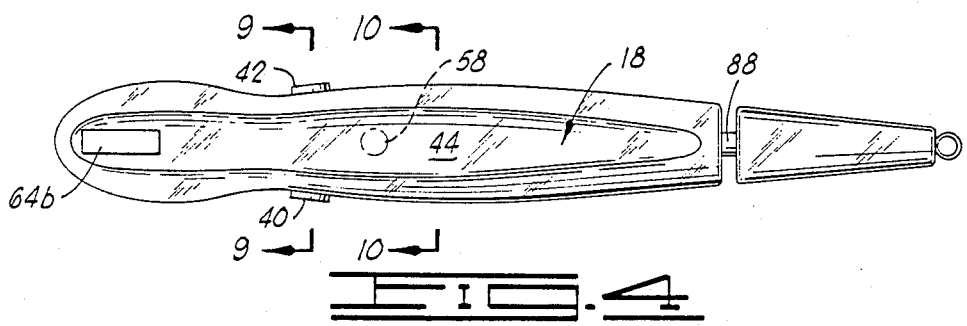
FIG. 4 is a bottom plan view of the fishing lure.
Figures 5, 6, 7:
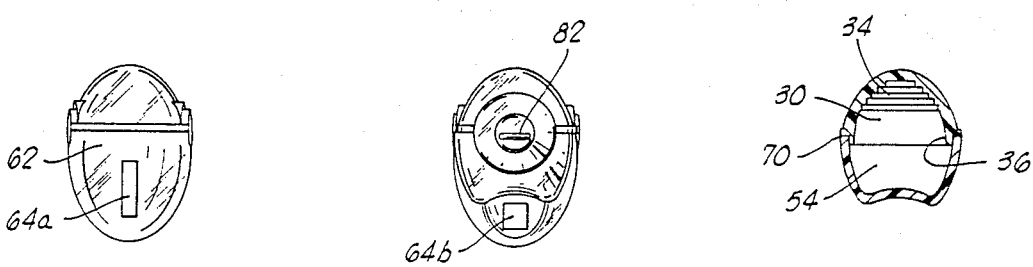
FIG. 5 is a front elevation view of the fishing lure.
FIG. 6 is a rear elevation view of the fishing lure.
FIG. 7 is a sectional view taken along line 7—7 of FIG. 1.

To aid in registering the concave upper body part 16 with the concave lower body part 18, the outer shell 20 of the upper body part 16 has a small step or rib 36 which extends completely around the lower or inner edge of the shell. The rib 36 is dimensioned for engagement with a complementary rib or step (hereinafter described) carried on the upper edge of a corresponding concave outer shell of the lower body part 18. The rib 36 is best shown in FIGS. 3 and 7 of the drawings.

At a location near the forward end of the concave upper body part 16, a pair of indented eye sockets 38 are formed in the outer surface of the concave outer shell and function to receive a pair of eye elements 40 and 42. The eye elements 40 and 42 can be small discs having an appropriate eyeball indicia placed on one side thereof.

The concave lower body part 18 is configured in a generally complementary configuration to the upper body part 16 and is adapted to be interfitted therewith to form the elongated forward body portion 10 of the lure. Thus, the lower body part 18 includes a concave outer shell 44 which has a forward end 46 and a rear end 48 and has a rear closure plate 50 extending across the rear end of the concave outer shell. The closure plate 50 defines a semicircular opening 52 which cooperates with the semicircular opening 28 in the closure plate 26. As previously stated, the semicircular opening 52 mates with the semicircular opening 28 to form an opening through which a cylindrical neck carried on the body tail section 14 extends in a manner hereinafter explained.

Spaced forwardly from the rear closure plate 50 is a rear transverse partition 54 which extends parallel to the rear closure plate 50 and projects across the concave outer shell 44 of the concave lower body part 18. The rear transverse partition 54 is located so that it is aligned with the rear transverse partition 30 at a time when the concave upper body part is mated and interfitted with the concave lower body part as illustrated in the drawings. The rear transverse partition 54 carries a rib or step 56 which is offset so that the steps 56 and 32 interengage in the manner illustrated in FIG. 3 of the drawings. The concave lower body part 18 further carries a centrally located post or boss 58. The boss 58 projects upwardly from the center of the concave outer shell 44. The boss 58 is of sufficient length that it extends from the concave outer shell 44 of the lower body part 18 to a location which is closely adjacent to the inner surface of the concave outer shell 20 of the upper body part 16. The boss 58 functions to receive the screw end of a belly hook attachment screw eye (not shown).

The upper, inner edge 70 of the concave outer shell 44 of the lower body portion 18 is configured to interfit with the step or rib 36 carried on the concave outer shell 20 of the upper body part 18 as shown in FIG. 7. At the forward end 46 of the concave outer shell 44 of the lower body part 18, the diving plane subassembly 12 projects forwardly and downwardly from the front end of the lower body part. The diving plane subassembly 12 includes a synthetic resin, spoon-shaped paddle structure 62 which is molded integrally with the concave outer shell 44. The spoon-shaped paddle structure 62 has a convexly curved upper side, when viewed in side elevation as shown in FIG. 1, and a convex lower side. A graphite pull plate 64 having an upwardly extending blade 64a and a keel 64b is molded into, or embedded in, the synthetic resin of which the paddle structure 62 is constructed. The graphite pull plate 64 defines an aperture 68 which may be used for the attachment of a fishing line thereto for retrieving the lure. The pull plate 64 is configured to have an arcuate or convexly curved upper edge to aid in preventing the lure from becoming snagged or fouled. Further its lower edge is secured to a flat transverse plate 69 which is embedded in the paddle structure 62.

The body tail section 14 is made up of several parts. These include an upper section half 74 and a lower section half 76. Each of the section halves are semicircular in cross-sectional configuration so that each section has a concave interior and a convex exterior. The shape of the two section halves together is such that the body tail section, as a whole, is a truncated cone-in-shape. The relatively narrow rear end of the lower section half 76 is solid by reason of filling with the synthetic resin of which the lure is constructed, and the resin at this point is further molded to provide an upwardly extending lug or stud 78. The stud 78 projects into a complementary socket 80 formed in the rear of the upper section half 74. The stud 78 functions as an anchor point to which a figure-eight shaped hook hanger 82 is secured. The hook is attached by passing a circular loop formed opposite the hook eye 84 around the stud before the upper and lower sections of the body tail section 14 are joined together.

The lower section half 76 carries a triangular reinforcing gusset plate 86 which is set in a plane containing the longitudinal axis of the lure, and the pointed upper end of the gusset plate 86 extends above the meeting line where the upper section half 74 and the lower section half 26 of the body tail section 14 are joined together.

Projecting forwardly from the forward end of the lower section half 76 of the body tail section 14 is a generally cylindrical neck 88 which carries at its forward end, a hemispherical ball element 90. The neck 88 passes through the mating or registering openings 28 and 52 formed in the aligned rear closure plates 26 and 50 of the concave upper and lower body parts 16 and 18. This construction permits the body tail section 14 to rotate through 360° about a longitudinal axis of the lure. It will be further noted that the way in which the semicircular openings 28 and 52 are formed on a taper or bevel through the rear closure plates 26 and 50 of the body parts 16 and 18 enables the neck 88 and the tail section 14 to swivel up and down at varying angles to the longitudinal axis of the lure as shown in FIG. 9. This permits the tail section 14 to undergo further freedom of movement upwardly and downwardly, in addition to the rotational movement previously described. This movement tends to simulate the natural movement of the tail of a swimming fish, and the described movement capability also aids in preventing the lure from becoming fouled in underbrush and the like. Moreover, the rotational freedom, afforded by the ball in socket configuration, decreases the ability of a fish to apply twisting leverage to the tail hook which, on conventional designs, can destroy the connection.

From the foregoing description of the invention, it will be perceived that the present invention provides a very realistic and life-like fishing lure which, because of its rugged construction, is characterized in having a long and trouble-free operating life. The swivelling and pivotal movements of the tail section provide advantages of natural simulation and foul prevention. Although a preferred embodiment of the invention has been herein set forth in order to illustrate the principles which illustrate the invention, it will be appreciated that various changes and innovations in the described lure structure can be effected without departure from the basic principles which underlie the invention. Therefore, such changes are deemed within the spirit and scope of the invention, and a reasonable range of functionally equivalent structures should be contemplated as encompassed within the invention which is to be protected by the present patent.

What is claimed is:

1. A fishing lure comprising:
   a hollow forward body portion having a forward end and a rear end portion defining a opening into the interior of the forward body portion, said hollow forward body portion including:
   an upper body part; and
   a lower body part, each of said upper and lower body parts having a forward end and a rear end, and having a closure plate at the rear end thereof, each of said closure plates defining a semicircular opening, with the closure plate semicircular openings registering to form a substantially circular opening at the time when said upper body part and lower body part are joined along a plane extending through the longitudinal axis thereof, said closure plates each having a beveled surface thereon immediately adjacent its respective closure plate semicircular opening to define a tapered, outwardly, flaring frustoconical surface surrounding said opening and facing rearwardly;
   a body tail section of generally frustoconical configuration;
   a neck projecting from said tail section through the circular opening defined by said closure plates in the rear ends of said upper body part and said lower body part;
   rear partition means on said upper and lower body parts spaced forwardly from, and defining with, said closure plates, a chamber in the rear end portion of said forward body portion of said lure;
   a semispherical ball element secured to the neck at a location within said chamber in the rear portion of said forward body portion of the lure with the arcuate semispherical surface of said semispherical ball element facing rearwardly toward said closure plates and forming a bearing surface to permit said semispherical ball element to rotate in every direction of movement and through 360° against said closure plates to thereby permit said neck and said tail section to rotate about the projected axis of said forward body portion and to pivot in any direction with respect to said longitudinal axis; and
   a diving plane subassembly secured to the forward end portion of said forward body portion and projecting forwardly and downwardly therefrom.

2. A fishing lure as defined in claim 1 wherein said body tail section is of two-part construction and includes:
   an upper section half and a lower section half interfitted with said first section half along a plane containing the longitudinal axis of the generally frustoconical body tail section; and
   wherein said fishing lure further comprises, a hook hanger having a first part secured between the upper section half and lower section half of said body tail section, and further having a hook eye projecting from the rear end of said body tail section for engaging a hook.

3. A diving plane subassembly as defined in claim 1 wherein said diving plane subassembly includes:
   a synthetic resin spoon-shaped paddle molded integrally with said hollow forward body portion of said lure and projecting forwardly and downwardly therefrom; and
   a graphite pull plate embedded in said synthetic resin spoon-shaped paddle and defining an aperture therethrough for attachment of a retrieving line to said graphite pull plate.

4. A fishing lure as defined in claim 3 wherein said body tail section is of two-part construction and includes:
   an upper section half and a lower section half interfitted with said first section half along a plane containing the longitudinal axis of the generally frustoconical body tail section; and
   wherein said fishing lure further comprises, a hook hanger having a first part secured between the upper section half and lower section half of said body tail section, and further having a hook eye projecting from the rear end of said body tail section for engaging a hook.

5. A fishing lure as defined in claim 1 and further characterized as including a pair of elongated, parallel chines extending along the lower outer side of said lower body part of said forward body portion.

6. A fishing lure as defined in claim 1 wherein said body tail section is of two-part construction and includes:
   an upper section half and a lower section half interfitted with said first section half along a plane containing the longitudinal axis of the generally frustoconical body tail section; and
   wherein said fishing lure further comprises, a hook hanger having a first part secured between the upper section half and lower section half of said body tail section, and further having a hook eye projecting from the rear end of said body tail section for engaging a hook.

7. A fishing lure as defined in claim 6 wherein said lure is further characterized as including:
   a stud projecting from the lower section half of said tail section toward the upper section half of said tail section; and
   a hook hanger connected to said stud.

8. A fishing lure as defined in claim 1 wherein said upper section part has a lower edge adjacent said lower body part, and wherein said lure further includes a rib formed on said lower edge of said upper body part and interfitting with the upper edge of said lower body part.

9. A fishing lure as defined in claim 8 wherein said diving plane subassembly secured to, and projecting forward from, the front end of the forward body portion comprises:

a spoon-shaped paddle projecting forwardly and downwardly from said lower body part of said two-part hollow forward body portion; and a graphite pull plate having a portion embedded in said synthetic resin spoon-shaped paddle and projecting upwardly therefrom, said graphite pull plate defining an aperture for the attachment of a retrieving line thereto.

* * * * *